United States Patent [19]

Melliger

[11] 4,407,844

[45] Oct. 4, 1983

[54] COATING PROCESS

[75] Inventor: Guido W. Melliger, Dover Garden Motel, Apartment 44, S. Salem St., Victory Garden, Dover, N.J. 07801

[73] Assignee: Guido W. Melliger, Dover, N.J.

[21] Appl. No.: 304,100

[22] Filed: Sep. 21, 1981

Related U.S. Application Data

[60] Division of Ser. No. 140,469, Apr. 17, 1980, Pat. No. 4,310,562, which is a division of Ser. No. 934,519, Aug. 17, 1978, abandoned, which is a division of Ser. No. 777,468, Mar. 14, 1977, Pat. No. 4,133,290, which is a continuation-in-part of Ser. No. 672,766, Apr. 1, 1976, abandoned.

[51] Int. Cl.³ ............................................. A01N 25/10
[52] U.S. Cl. ......................................................... 427/3
[58] Field of Search .................. 118/19, 20, 17; 427/3

[56] References Cited

U.S. PATENT DOCUMENTS 4,118,522 10/1978 Stellmach .............................. 427/3

Primary Examiner—Sam Silverberg

Attorney, Agent, or Firm—Gerald D. Sharkin; Robert S. Honor; Walter F. Jewell

[57] ABSTRACT

This invention provides an apparatus and process for automatically coating solid pharmaceutical dosage forms, e.g., tablets. The apparatus comprises a coating pan, having a rotating means, e.g., motor and a weighing means, e.g., scales in combination with the pan and motor. A process controller is in electronic communication with both the pan motor and scales, for controlling the pan rotation and monitoring the weight of the coating pan contents. There is also provided a plurality of material containing reservoirs having conduit means communicating with the interior of the pan. The material containing reservoirs may also have weighing means, e.g., scales in combination with the reservoirs, which are also in electronic communication with the process controller. These reservoirs may contain a water supply, a coating syrup supply, color suspension supply, and polishing ingredients for use in coating the tablets. The process controller is pre-programmed to dispense the various coating ingredients in a precise sequence, while monitoring the coating weight of the tablets, whereby the entire coating process is automatically effectuated in one continuous operation.

6 Claims, 4 Drawing Figures

COATING PROCESS

This is a division of application Ser. No. 140,469, filed Apr. 17, 1980 U.S. Pat. No. 4,310,562, which in turn is a division of application Ser. No. 934,519, filed Aug. 17, 1978, now abandoned, which in turn is a division of application Ser. No. 777,468, filed Mar. 14, 1977, now U.S. Pat. No. 4,133,290, which in turn is a continuation-in-part of Ser. No. 672,766, filed Apr. 1, 1976, now abandoned.

BACKGROUND OF THE INVENTION

This invention relates to coating of solid pharmaceutical dosage forms. More particularly, it relates to an automatic, continuous coating of solid pharmaceutical dosage forms.

In the prior art coating of solid pharmaceutical dosage forms, e.g., tablets, many of the coating steps require introduction of manual labor. These prior art coating processes also are relatively imprecise in the amounts of ingredients that are placed upon the tablets, causing variations in finished tablets.

SUMMARY OF THE INVENTION

Figure 1:
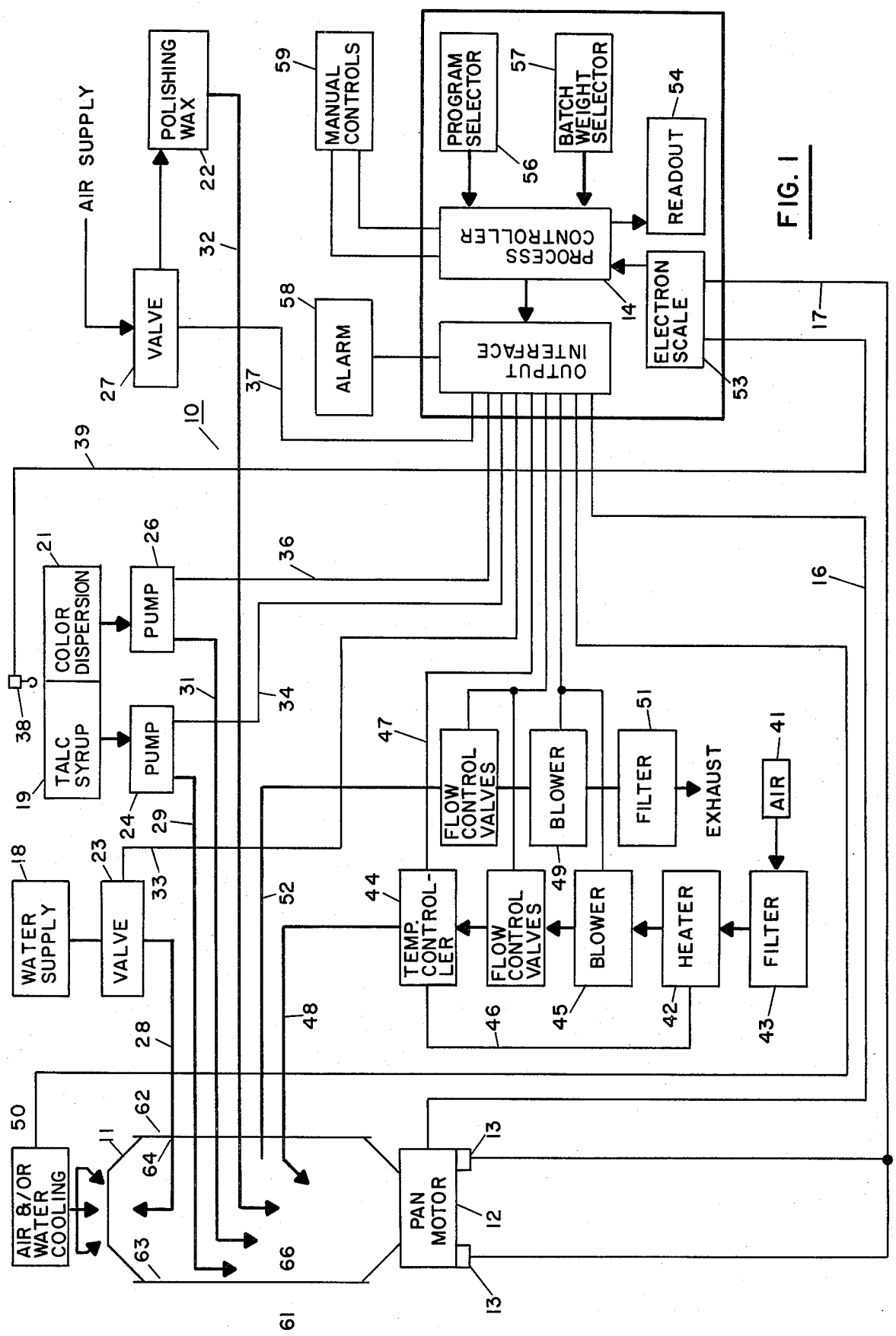
FIG. 1 is a schematic representation of a coating apparatus of this invention.

Broadly, this invention provides an apparatus for automatic and continuous coating of solid pharmaceutical dosage forms, e.g., tablets, and comprises a container means, e.g., coating pan, in rotatable communication with a rotating means, e.g., motor, with both the coating pan and the motor in operative relation to a weighing means, e.g., scale. Preferably the coating pan rests upon the motor and is rotated by it about the horizontal axis of the pan, with both pan and motor resting upon one or more scales.

One or more material reservoirs are provided which have conduit means in fluid communication with the interior of the coating pan. Flow control means, e.g., a valve or pump are provided for the control of the flow of the material in the reservoir through the conduit means into the interior of the coating pan.

A process controller means which is in independent electronic communication with each of the motor, scale, valve and/or pump, controls the rotation of the coating pan and the flow of material from the reservoir in a preprogrammed sequence, based upon the changing weight of the tablets and coating material in the coating pan.

In a preferred embodiment of the invention at least one of the material reservoirs are in operative relation to a reservoir weighing means, e.g., scale, for continuously determining the weight of the material in the reservoir, with the scale in electronic communication with the process controller means, for continuous monitoring of the weight of the material in the reservoir.

In a further preferred embodiment of this invention, one or more of the material reservoir conduits may have one or more nozzles for introducing material from the reservoir into the interior of the coating pan. The nozzle comprises a fluid outlet port in fluid communication with the reservoir conduit, a circumferential air chamber about the fluid outlet port with the air chamber having an air inlet. The fluid outlet port has an extendable portion beyond the air chamber with an elastomeric cap in normally air tight engagement with the extended portion. A fastening means, e.g., locking nut holds the cap in air-liquid sealed engagement with the end of the air chamber.

The apparatus also provides an air supply means and air exhaust means in fluid communication with the interior of the coating pan; both the air supply means and the air exhaust means are in electronic communication with the process controller means.

The apparatus is preferably supplied with a heating means, temperature regulating means and filtering means for the air supply means. The air supply means and the air exhaust means are also provided with air flow regulating mans.

There is also provided an alarm means for the process controller means, whereby malfunctions in the process are automatically brought to the operator's attention, and whereby the apparatus is automatically shut down.

While it is within the scope of the invention that some of the reservoir means may have a common pump, it is preferred that each reservoir with a pump means have an individual pump.

It is also within the scope of the invention that the materials in the reservoirs may be transferred into the coating pan by means of metering pumps actuated by the process controller means without the necessity of monitoring the weight of the material in the reservoir.

In the operation of the automatic coating apparatus, the process controller, prior to each cycle senses the weight of the tablets in the coating pan (via the scale) and applies the required amount of coating material to the tablets in the sequence programmed. Based on the weight reading of tablets plus the coating pan, the process controller calculates how much material to add for each cycle to attain a specific required weight. A base coating, medium coating, and color coating are applied as solutions or dispersions. The weight of these liquids in the reservoirs are monitored by the process controller and the required amount is delivered to the tablets in the coating pan upon a signal from the process controller. Alternately, the liquids may be dispersed from the reservoirs by metering pumps upon a signal from the process controller means, without monitoring the weight of the liquids.

In a given sequence, a plurality of tablets are charged into the coating pan and the weight of the pan and tablets recorded in the process controller. The exact amount of coating liquid or pigment dispersion to be added is determined by the process controller, based on readings of the weight of the pan and tablets. The amount is calculated such that the specified weight of the final tablet is obtained regardless of variations in the density of the coating liquids or pigment dispersions or other factors. The coating liquid or pigment dispersions are added by weight of the liquid.

The process controller is actuated to effect and execute the individual steps of the process. The pan is rotated to tumble the tablets while a base coating is applied to the tumbling tablets as a series of individual coatings in the presence of drying air. After the base coating has been applied, the tablets may be additionally air dried. Following the drying cycle, a medium coating is applied as a series of individual coatings with air drying of each coating after an adequate tablet tumbling time. The interior surfaces of the pan are automatically cleaned and/or kept smooth by transferring adhered coating material from the pan walls to the tablets. The process then proceeds to the next step of coloring the tablets by the process controller actuating the rotation of the coating pan to tumble the tablets while a series of pigment dispersion coatings is applied to the tablets with air drying of the colored tablets after each application. The automatic cleaning of the interior surfaces of the pan may also be done during and after color coating. The tablets are automatically pre-polished after coloring by adding small amounts of pigment dispersion and first continuous, then intermittent tumbling of the tablets for a selected period of time in the absence of drying air, and then polished by continuously tumbling the tablets while applying a polishing material on the tablets. At the end of the polishing stage, the process is stopped and the tablets may be removed from the coating pan.

In a preferred embodiment of this invention, the pan walls may be cooled externally by blowing cold air and/or spraying a fine mist of water over the outside of the pan during part of or during the entire base coat and medium coat and color applications. By cooling sufficiently, any build-up of coating material on the pan may be eliminated.

In another embodiment of this invention, the pan may be kept clean by spraying water on the inside of the pan wall after the syrup application, while the drying air flow is reduced, or turned off completely. The relatively high humidity resulting inside the pan softens the build-up on the pan and transfers it onto the tablets. Sections of the pan where build-up of the coating materials is more intense, may be sprayed more frequently.

In still another embodiment of this invention, a combination of cooling the pan and spraying water on the interior surface may be used to prevent coating material build-up.

Additionally, before each medium coat application, a fine mist of water is applied to the interior of the pan surface. The fine water mist is believed to dissolve some of the material built up on the tablets and transfer this as a thin film to the pan interior surface giving the tablets enough grip to tumble over the smooth pan surface rather than slide upon it.

In a clean pan, the tablets slide rather than tumble, which has a negative effect on weight distribution and shape of the tablets. To give the pan a very slight roughness, just enough to keep the tablets tumbling for the duration of liquid addition, a fine mist of water is sprayed on the interior surface of the pan approximately 10 to 30 seconds before the liquid addition. This spraying has little or no effect on the formation of material build-up since at the time of spraying the dry air flow is turned on full and the humidity inside the pan is low.

In each of the steps of base coating, medium coating, coloring, pre-polishing, and polishing, the materials required are automatically supplied to the tablets in a precise sequence and in the required quantities.

In the operation of the apparatus of this invention, the drying air may be delivered to a 300 kg. capacity coating pan at about 600 to 800 cubic feet per minute (CFM), (full air flow), and at a temperature of from ambient temperature to 70° C.

DETAILED DESCRIPTION OF AN EMBODIMENT OF THE INVENTION

Referring now to FIG. 1, the apparatus of this invention is shown generally at 10. It comprises a coating pan 11, rotatable about its horizontal axis, a motor 12, for rotating the pan 11, load cells, e.g., scales 13. Preferably the pan motor 12 which supports and rotates the coating pan 11, rests upon the scales 13. Both the motor 12 and the load cells 13 are in electronic communication with a process controller 14, via circuits 16 and 17. The apparatus is also provided with material reservoirs 18, 19, 21, and 22. Reservoir 18 may be a pressurized purified water supply, reservoir 19 may contain a coating fluid, e.g., talc syrup, for use in the base coating and medium coating, reservoir 21 may contain another coating fluid, e.g., a color solution or dispersion, for the color coating of tablets; and reservoir 22 may contain a polishing wax, e.g., carnauba wax powder, for polishing tablets. Each of the reservoirs 19 and 21 is provided with a conventional liquid pump means 24 and 26. Reservoir 18 is provided with a conventional liquid valve 23 and reservoir 22 is provided with an air supply controlled by a conventional pneumatic valve 27. Each of valve 23 and the pumps 24 and 26 are in fluidic communication with the interior of the pan 11, via conduits 28, 29 and 31. Reservoir 22 is in fluidic communication with the interior of pan 11, via conduit 32. The valve and pumps 23, 24, 26, and 27 are in electronic communication with the process controller 14, via circuits 33, 34, 36, and 37. The reservoirs 19 and 21 are preferably suspended from a load cell, e.g., scale 38, which load cell is in electronic communication with the process controller 14, via circuit 39.

Figure 2:
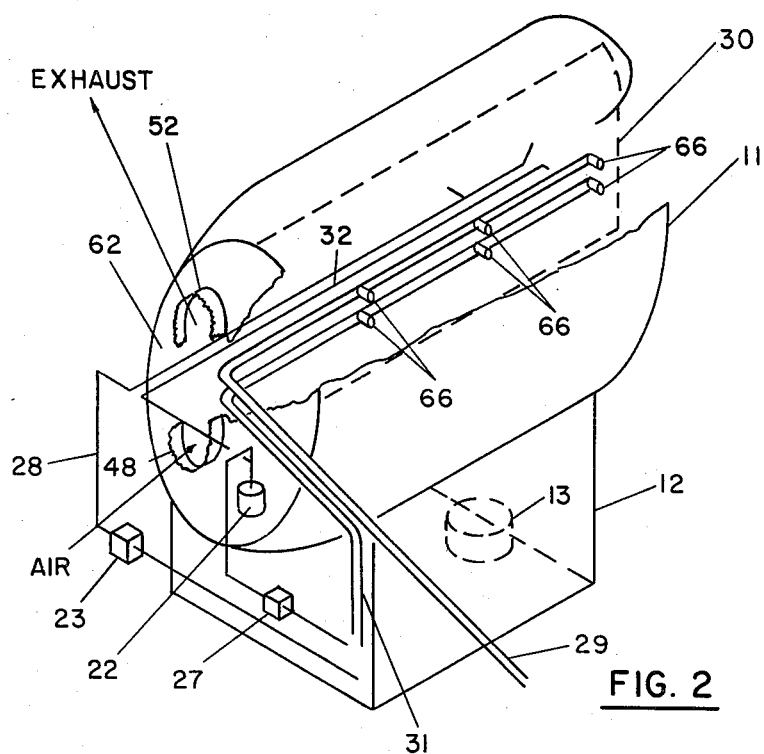
FIG. 2 is an isometric view of the front of a coating pan of a coating apparatus of this invention.

FIG. 2 depicts the reservoir conduits 28, 29, 31, and 32 entering the rear of the coating pan 11. A housing 30 (shown in phantom in FIG. 3) may be used to cover these conduits with the end of the conduits protruding from the housing 30 into the pan 11. Conduits 29 and 31 are equipted with nozzles 66 which are more fully described further on.

The apparatus is further provided with an air supply means 41, which air supply has a heater means 42, a filter means 43, a temperature controller 44 and a blower means 45. The temperature of the heater 42 is controlled by the temperature controller 44, via circuit 46. The temperature controller is in electronic communication with the process controller, via circuit 47. The air supply means 41 is in communication with the interior of the coating pan 11, via conduit 48. The apparatus is also supplied with air and/or water cooling means 50, for cooling the outside surface of the pan 11.

The apparatus is also supplied with exhaust means for exhausting the coating pan 11, and it comprises a blower 49 and a filter 51. The blower is in communication with the interior of the coating pan 11, via a conduit 52.

The air supply means and the exhaust means are each provided with flow control valves which allow for three levels of control (1) cut off (no air), (2) reduced air flow, and (3) full air flow. Reduced air flow is approximately one-third of full air flow.

Figure 3:
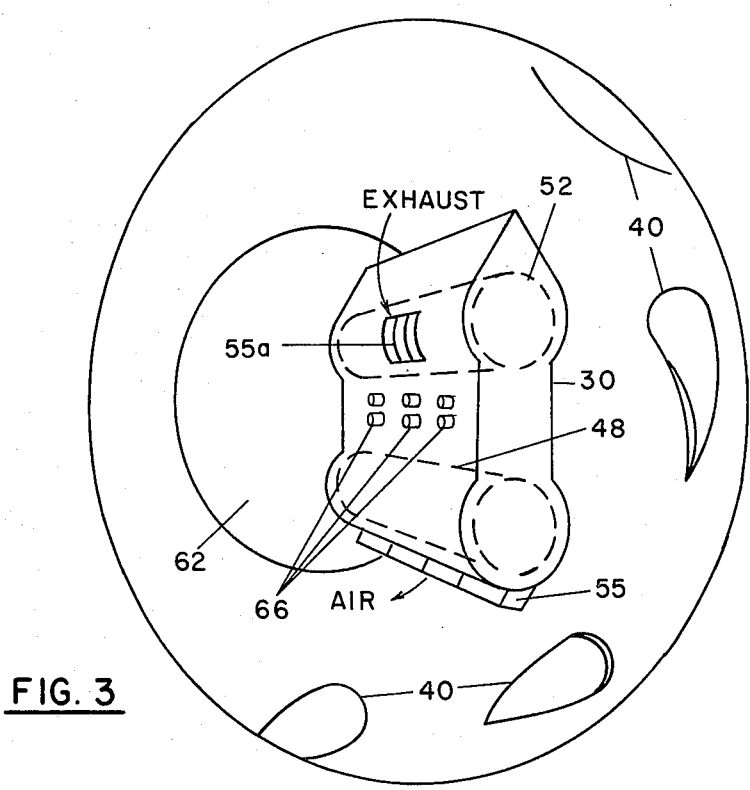
FIG. 3 is an isometric view of dispursing means of a coating apparatus of this invention.

As shown in FIG. 3 conduits 48 and 52 may be located within the housing 30. The air flow from conduit 48 into the pan 11 is via air vents 55. The pan 11 is exhausted via exhaust vent 55a, which may be covered with a screen on the housing 30 opening.

The electronic communication of circuits 17 and 39 with the process controller is, via an electronic scale 53, which scale is integrated into the process controller.

The process controller is provided with a read-out means 54, which may be of the type well known in the art, such as an alphanumeric read-out. The controller is further provided with a program-selector 56 and batch-weight selector 57 for automatic compensation for batch weight variations. An alarm system 58 is provided for the detecting of abnormalities in the process and a manual controller 59 which overrides the process controller is also provided.

The coating pan 11 is also provided with seals 61 and 62 on the openings 63 and 64. These seals may be in the form of panels, such as metal or plexiglass. Seal 62 is provided with openings for the various conduits entering the pan 11 interior. The coating pan 11 may be conveniently charged through a removable seal 61.

Figure 4:
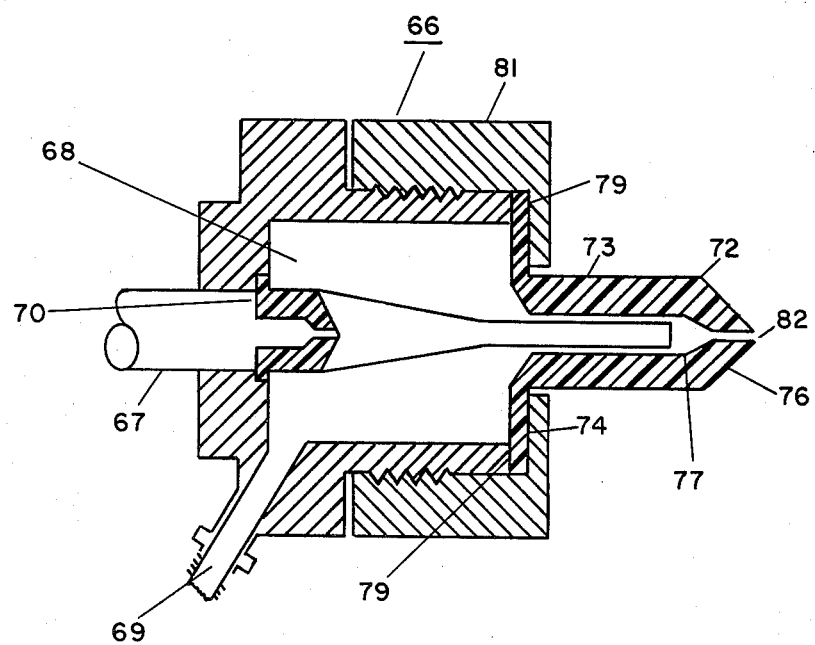
FIG. 4 is a cross-sectional view of a spray nozzle of this invention.
Figure 4:
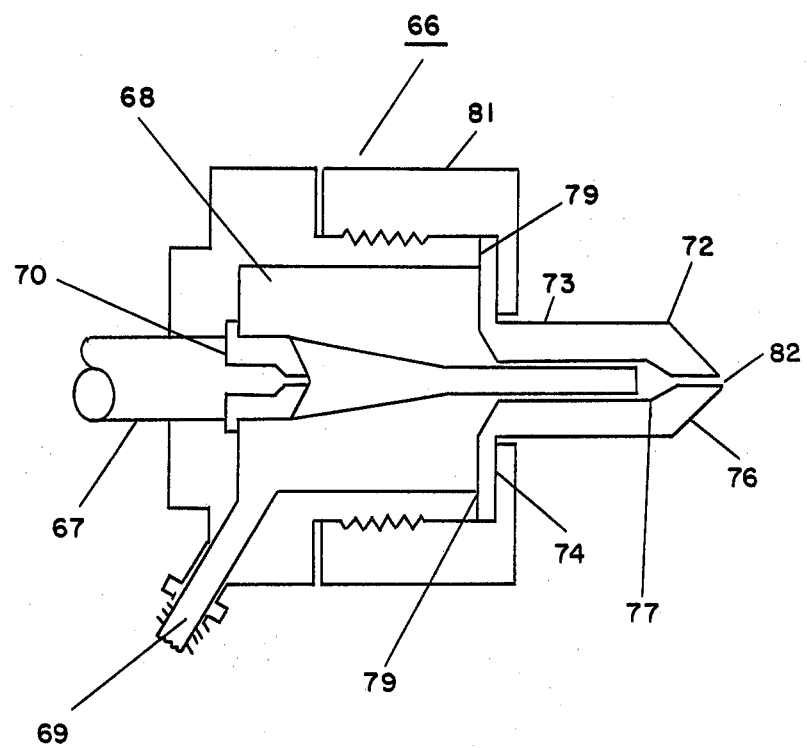

In an additional preferred embodiment of this invention, the conduits 29 and 31 are provided with one or more nozzles 66 illustrated in FIG. 4. While each conduit 29 and 31 may contain one or a plurality of nozzles 66, a description of one nozzle will be sufficient to illustrate the embodiment.

The nozzle 66 is detachably mounted in fluid tight relationship (not shown) on either or both of conduits 29 and 31 by conventional means, e.g., locking nut. The nozzle 66 comprises a fluid outlet port 67 for disbursing the coating fluids. Circumferential about port 67 is an air chamber 68, having an air inlet port 69. (The air supply for port 69 may be the same as for valve 27 or may be an independent source.) The fluid outlet port 67 extends beyond the air chamber 68. The portion of the port 67 extending beyond the air chamber 68 is in normally airtight engagement with a center bore 77 of a spray cap 72. The cap 72 comprises a generally V-shaped wedge-like tip 76 at its distal end. At the proximal end of the bore 77, the bore flares conically. The cap 72 is held in air-fluid tight engagement against the end 79 of the air chamber 68 by a locking nut 81.

The cap 72 is made of an elastomeric material, e.g., silicon rubber and has on the apex of the V-shaped tip 76 a normally closed expandable apperature 82.

The coating liquid inlet port 67 may also be provided with a check valve 70 which is similar to the spray cap 72. The check valve 70 prevents any back flow of air into conduit 67 when cleaning or purging the nozzle with air.

In operation, coating fluids are pumped via conduits 29 and 31 into the port 67. Simultaneously, air under pressure from the air inlet port 69 enters the air chamber 68. The air then enters the conical area at the proximal end of the bore 77 and is forced along the normally closed bore 77 expanding it to reach the apperature 82. The air and/or liquid pressure forces open the normally closed apperature 82, allowing the air and coating fluids to enter the pan 11 as an atomized spray. When the liquid addition is completed, reduced pressure in the tip allows the apperature 82 to close.

The spray nozzle 66 may also be operated without air pressure from the air inlet port 69, when so used, the coating fluids enter the pan 11 as a stream and are poured on the tablets.

The spray nozzle described prevents the coating fluids from dripping, drying out, and/or clogging the conduits 29 and 31, and air inlet port 69.

In another embodiment of this invention, the coating pan 11 may be equipped with baffles 40 (See FIG. 3) on its internal surface. These baffels 40 may be hollow and contain a heat transfer liquid, e.g., water, which acts as a heat exchanger to help maintain the temperature of the coating pan at the desired temperature. These baffels 40 may also act in conjunction with the external pan cooling means 50 to maintain the desired pan surface temperature.

In a further embodiment of this invention, the load cell 38 is eliminated and each of the pump means 24 and 26 are metering pumps. In operation the process controller 14 dispenses the liquids in reservoirs 19 and 21 by actuating the metering pumps 24 and 26. All other aspects of the invention are as described above.

While the apparatus of this invention has been described in relation to syrup coating, nevertheless, the apparatus may also be used for film coating of tablets, wherein a film, e.g., polymeric film is applied to the tablets. When so operated normally only the load cell 38 and one reservoir 19 or 21 is used to dispense the film coating solution. The pan load cell 13 is not in operation. The desied weight amount of film coating solution is automatically dispensed by the process controller 14 from reservoir 19 or 21, via conduits 29 or 31 respectively, and applied to the tablets, until the desired film coat weight is achieved. The air flow and exhaust system are actuated during the film coating process. Nozzle 66 is used in its atomized spray mode.

The operation of the apparatus of this invention will be understood from the following example, wherein tablet cores are automatically syrup coated.

EXAMPLE

One hundred-seventy kilos of tablets (approximately 1.1 million tablets) are charged into a 300 kilogram Pelligrini coating pan 11. The process controller 14 is actuated after having pre-selected the batch weight and the coating procedure to be followed for the particular tablets to be coated. The tablets to be coated each have a 160 milligram core of which 25 milligrams is MELLARIL (thioridazine HCl, Sandoz, Inc. Hanover, New Jersey).

The controller is actuated and the following coating steps affectuated with the process controller 14 monitoring the weight of the tablets in the coating pan 11 prior to each liquid addition, and comparing that weight to what the tablets should weigh at that point in the tableting process; and if necessary, adjusting the dispersing of the liquid accordingly.

Step 1—The tablets are base coated by addition of one kilogram of talc syrup from the talc syrup reservoir 19. This amount of syrup is added eight times to the rotating coating pan to produce eight coats on the tablet core. It is added at intervals of 5 minutes in the presence of 70° C. air at 600 to 800 CFM air flow.

Step 2—A medium coating of approximately three kilos of talc syrup per application is applied as 32 coats to the tumbling tablets from the talc syrup reservoir 19. Each talc syrup application is applied at the beginning of a 12-minute cycle. For the first $2\frac{1}{2}$ minutes of the cycle, there is no air flow. From $2\frac{1}{2}$ minutes until 6 minutes this is reduced air flow, and from 6 minutes to 12 minutes there is full air flow. The air flow is at a temperature of 70° C. Additionally, 30 seconds before each medium coat application a fine mist of water is applied to the interior of the pan wall. The cooling blower is turned on at the beginning of each cycle and turned off as soon as the full air flow is turned on.

Step 3—The base and medium coated tablets are color coated by dispensing from reservoir 21, a dispersion of a pigment in a sucrose solution. This color dispersion is supplied in 30 cycles, with each cycle containing 900 to 1000 grams of the solution. Each cycle has the following sequence:

Addition of color dispersion 1.5 minutes tumbling without air, 2 minutes tumbling with reduced air flow, and 3.5 minutes of full air drying at from ambient temperature to 60° C., for a total of seven minutes per cycle.

Step 4—This is a pre-polishing step, which is divided into two parts. The first part consists of one to four applications of 0.5 kilos of color dispersion. The applications are applied at intervals of seven minutes without the presence of drying air. The second part of the pre-polishing step is a jogging cycle without the presence of drying air, wherein the pan is rotated, e.g., tablets tumbled, for three seconds every two minutes. This is repeated for ten cycles; at which time the tablets are tumbled for three seconds every five minutes and this is repeated for ten cycles.

Step 5—The tablets are polished by blowing, via conduit 27, 50 grams of carnauba wax over the tablets within a twenty second period. The tablets are then continuously tumbled for 45 minutes without drying air.

At the end of the tumbling period, the coated, colored, and polished tablets are removed from the coating pan.

What is claimed is:

1. In a process for coating solid pharmaceutical dosage forms which comprises charging a plurality of tablets into a coating pan, rotating the pan to tumble the tablets while applying a series of coatings to the tablets, the improvement which comprises cooling the coating pan to control the deposit of coating material on the inside of the pan wall by applying a cooling medium to the external surface of the coating pan, while coating the tablets.

2. The process according to claim 1 wherein the coating pan is cooled by blowing air over the external surface of the pan.

3. The process according to claim 1 wherein the coating pan is cooled by applying cooling water to the external surface of the pan.

4. The process according to claim 1 wherein prior to each coating step a fine mist of water is applied to the interior of the coating pan wall.

5. The process according to claim 2 wherein prior to each coating step a fine mist of water is applied to the interior of the coating pan wall.

6. The process according to claim 3 wherein prior to each coating step a fine mist of water is applied to the interior of the coating pan wall.

* * * * *